United States Patent
Young et al.

(10) Patent No.: US 9,081,522 B2
(45) Date of Patent: Jul. 14, 2015

(54) METHOD AND SYSTEM FOR SEARCHING FOR MISSING RESOURCES

(75) Inventors: Kenneth H. Young, Foster City, CA (US); Randy Cruz Soriano, San Leandro, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 803 days.

(21) Appl. No.: 12/952,438

(22) Filed: Nov. 23, 2010

(65) Prior Publication Data

US 2012/0127507 A1    May 24, 2012

(51) Int. Cl.
  *G06K 15/00*  (2006.01)
  *G06F 3/12*  (2006.01)
(52) U.S. Cl.
  CPC .............. *G06F 3/122* (2013.01); *G06F 3/1243* (2013.01); *G06F 3/1285* (2013.01); *G06F 3/129* (2013.01); *G06F 3/1229* (2013.01); *G06F 3/1291* (2013.01)
(58) Field of Classification Search
  USPC ....................................................... 358/1.14
  See application file for complete search history.

(56) References Cited

U.S. PATENT DOCUMENTS

| 6,308,173 | B1* | 10/2001 | Glasser et al. ........................ 1/1 |
| 6,338,112 | B1* | 1/2002 | Wipfel et al. ................. 710/269 |
| 8,601,032 | B2* | 12/2013 | Aikawa et al. ................ 707/803 |
| 2005/0275851 | A1* | 12/2005 | Kim .............................. 358/1.1 |
| 2008/0106762 | A1* | 5/2008 | Mullender et al. ........... 358/1.16 |
| 2011/0022631 | A1* | 1/2011 | Aikawa et al. ................ 707/770 |
| 2012/0078997 | A1* | 3/2012 | Evans et al. ................... 709/203 |
| 2012/0079606 | A1* | 3/2012 | Evans et al. ..................... 726/28 |

* cited by examiner

*Primary Examiner* — Marcus T Riley
(74) *Attorney, Agent, or Firm* — Buchanan, Ingersoll & Rooney PC

(57) ABSTRACT

A method of searching for missing resources associated with an image forming apparatus, which includes the steps of: forwarding a print job having a resource call-out from a host computer to an image forming apparatus; receiving the print job on the image forming apparatus; checking the image forming apparatus for a resource, which has been called out by the print job, and if the resource is not available on the image forming apparatus, obtaining the resource by: sending a request for the resource from the image forming apparatus to a device having the resource; receiving a response from the device having the resource indicating that the resource is a non-sharable resource and including at least one link to where the non-sharable resource can be obtained; and choosing a link having the non-sharable resource and obtaining the non-sharable resource.

21 Claims, 6 Drawing Sheets

METHOD AND SYSTEM FOR SEARCHING FOR MISSING RESOURCES

FIELD OF THE INVENTION

This invention relates to an image forming apparatus and, more particularly to a method and system for searching for missing resources within a local area network (LAN), a wide area network (WAN) and/or a World Wide Web (or "cloud") for a print job, which is received by an image forming apparatus or multi-function printer.

BACKGROUND OF THE INVENTION

In today's large image forming apparatus or multi-function printer (MFP) environments, some print jobs contain resources in the data stream that the multi-function printer can save in its internal hard disk. The resources contained in the data stream can be in the form of a bitmap. When the resource is saved in the hard disk, a file name is preferably assigned to the resource for later use. It can be appreciated that the resources can include but are not limited to graphics/images, logos, form overlays, fonts, barcodes, graphic bitmaps, etc.

At a later time, if the user runs a similar job using the same resources, the print job will include a "call-out", which identifies the resource file name within the data. It can be appreciated that the print job does not need to include the bitmaps for the resource once again, since the resource is already stored on the multi-function printer's hard disk from the previous job. Typically, the multi-function printer can choose if it wants to store the resource directly from the data stream, or, if it wants to store the resource after it has gone through image processing routines (e.g., color matching and half toning).

It can be appreciated that when a print job is submitted to the multi-function printer that includes a "call-out" (i.e., a resource's file name), the multi-function printer may not have the resource stored on the multi-function printer's system or hard disk. When this happens, the multi-function printer can substitute the requested resource with a similar resource, or alternatively, the multi-function printer can use a default resource.

It would be desirable in accordance with an exemplary embodiment, that if the resource is not available on the multi-function printer, the multi-function printer (or image forming apparatus) is configured to search and receive the resource from another device within a local area network (LAN), a wide area network (WAN), and/or World Wide Web (cloud).

OBJECTS AND SUMMARY

The present invention has been made in consideration of the above issues, and provides a system for searching for missing resources within a local area network (LAN), a wide area network (WAN) and/or World Wide Web (or cloud).

In accordance with an exemplary embodiment, a method of searching for missing resources associated with an image forming apparatus, comprises: forwarding a print job having a resource call-out from a host computer to an image forming apparatus; receiving the print job on the image forming apparatus; checking the image forming apparatus for a resource, which has been called out by the print job, and if the resource is not available on the image forming apparatus, obtaining the resource by: sending a request for the resource from the image forming apparatus to a device having the resource; receiving a response from the device having the resource indicating that the resource is a non-sharable resource and including at least one link to where the non-sharable resource can be obtained; and choosing a link having the non-sharable resource and obtaining the non-sharable resource.

In accordance with another exemplary embodiment, a computer program product comprising a non-transitory computer usable medium having a computer readable code embodied therein, the computer readable program code configured to cause an image forming apparatus to execute a process for producing a print job, the process comprising the steps of: forwarding a print job with a resource call-out from a host computer to an image forming apparatus; receiving the print job on the image forming apparatus; checking the image forming apparatus for a resource, which has been called out by the print job, and if the resource is not available on the image forming apparatus; sending a request for the resource from the image forming apparatus to a device having the resource; receiving a response from the device having the resource indicating that the resource is a non-sharable resource and including at least one link to where the non-sharable resource can be obtained; and choosing a link having the non-sharable resource and obtaining the non-sharable resource.

In accordance with a further exemplary embodiment, a printing system comprises: a host computer; and an image forming apparatus having a memory unit and a print engine connected to the memory unit for forming an image on a recording medium, wherein the image forming apparatus performs the following steps: forwarding a print job with a resource call-out from a host computer to an image forming apparatus; receiving the print job on the image forming apparatus; checking the image forming apparatus for a resource, which has been called out by the print job, and if the resource is not available on the image forming apparatus; sending a request for the resource from the image forming apparatus to a device having the resource; receiving a response from the device having the resource indicating that the resource is a non-sharable resource and including at least one link to where the non-sharable resource can be obtained; and choosing a link having the non-sharable resource and obtaining the non-sharable resource.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
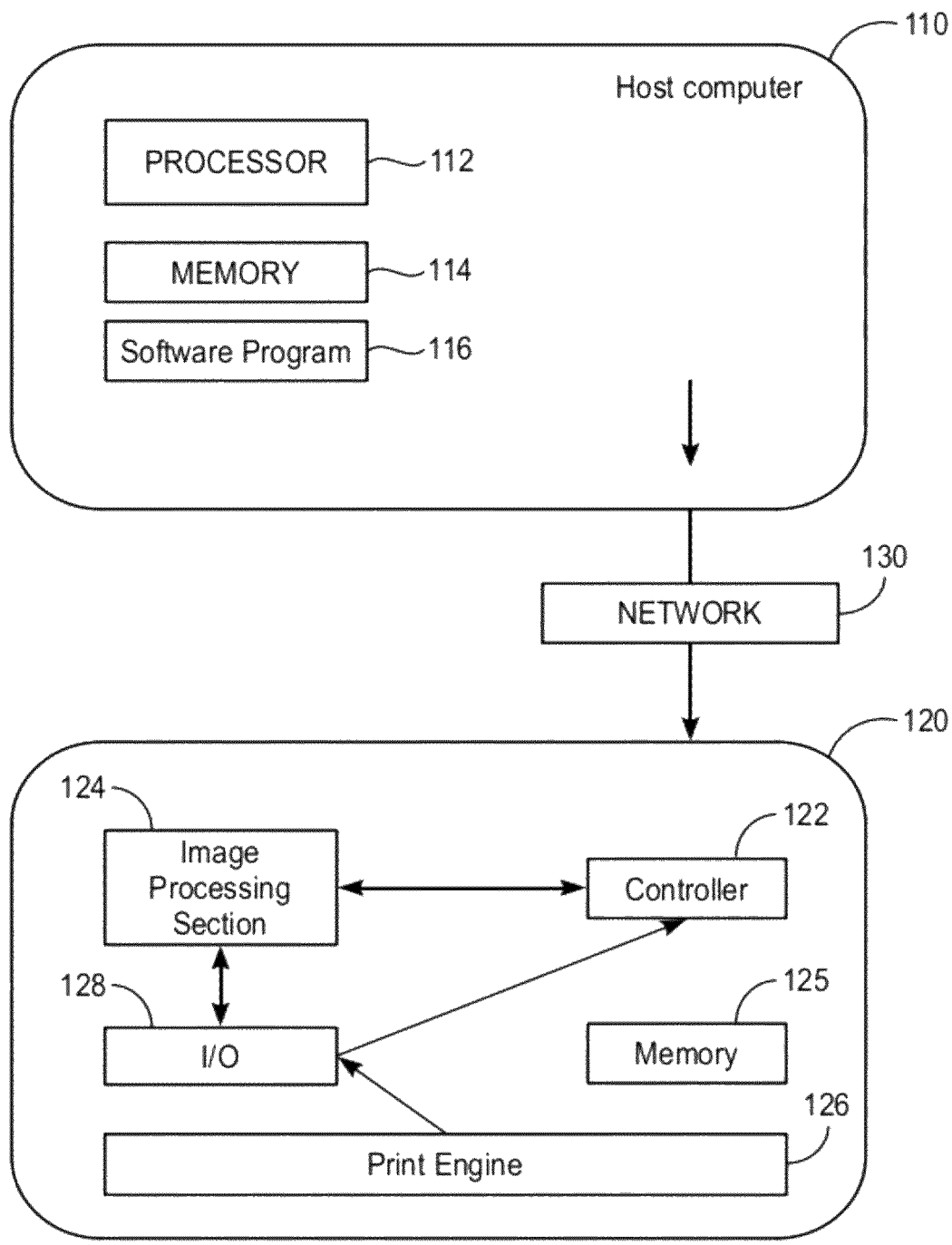
FIG. 1 is a diagram of a data processing system, which includes a host computer and an image forming apparatus connected to the host computer in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a method for searching for missing resources within a local area network (LAN), a wide area network (WAN) and/or World Wide Web (or cloud), which includes the steps of forwarding a print job with a resource call-out from a host computer to an image forming apparatus; receiving the print job on the image forming apparatus; checking the image forming apparatus for a resource, which has been called out by the print job, and if the resource is not available on the image forming apparatus, obtaining the resource from a device having the resource. The following illustrations describe the process of this method and a system for implementation thereof.

The methods described herein can be implemented in a data processing system 100 that includes a host computer 110 and an image forming apparatus 120 preferably in the form of a multi-functional printer connected to the host computer 110. A typical structure of the data processing system is shown in FIG. 1. The host computer 110 includes a processor 112 and one or more memories 114 for storing software programs 116 and data (such as files to be printed). The host computer 110 submits print jobs to the image forming apparatus (printer or printing device) 120 by transmitting data representing the documents to be printed and information describing the print job. The image forming apparatus (i.e., printer/printing device) 120 typically includes a controller 122, an image processing section (or data dispatcher) 124, memory 125 preferably in the form of a hard disk drive (HDD), a print engine 126, and an input/output (I/O) section 128.

The controller 122 may include a central processing unit (CPU), a random access memory (RAM), and a read only memory (ROM). The controller 122 processes the data and job information received from the host computer 110 to generate a print image. The image processing section 124 carries out image processing under the control of the controller 122, and sends the processed print image data to the print engine 126. The print engine 126 forms an image on a recording sheet based on the image data sent from the image processing section 124. The I/O section performs data transfer with the host computer 110. The controller 122 is programmed to process data and control various other components of the image forming apparatus or printer 120 to carry out the various methods described herein. The hard disk drive (HDD) or storage device 125 stores digital data and/or software programs for recall by the controller 122. In accordance with an exemplary embodiment, the digital data includes resources, which can include graphics/images, logos, form overlays, fonts, etc.

The input/output (I/O) port 128 provides communications between the printer section and the host computer 110 and receives page descriptions (or print data) from the host for processing within the image forming apparatus 120. In accordance with an exemplary embodiment, the operation of printer section commences when it receives a page description from the host computer 120 via I/O port 128 in the form of a print job data stream. The host computer 110 and the image forming apparatus (or printer) 120 are preferably connected to one another via a network 130. Examples of the network 130 consistent with embodiments of the invention include, but are not limited to, the Internet, an intranet, a local area network (LAN) and a wide area network (WAN). The image forming apparatus 120 and the client device can be connected with a wire or be connected with wireless by using radio frequency (RF) and/or infrared (IR) transmission.

Examples of image forming apparatuses 120 consistent with exemplary embodiments of the invention include multifunction printers (MFP), a laser beam printer (LBP), an LED printer, a multi-functional laser beam printer including copy function. In accordance with another exemplary embodiment, the image forming apparatus 120 is configured as a multi-function peripheral (MFP) device or all-in-one (AIO) that includes a printer section for converting print data inputted from outside to image data and forming and printing out the converted image onto a printable media, a scanner section for optically reading a document, and a facsimile section for facsimile receiving and transmitting image data to and from external apparatuses through public lines.

Figure 2:
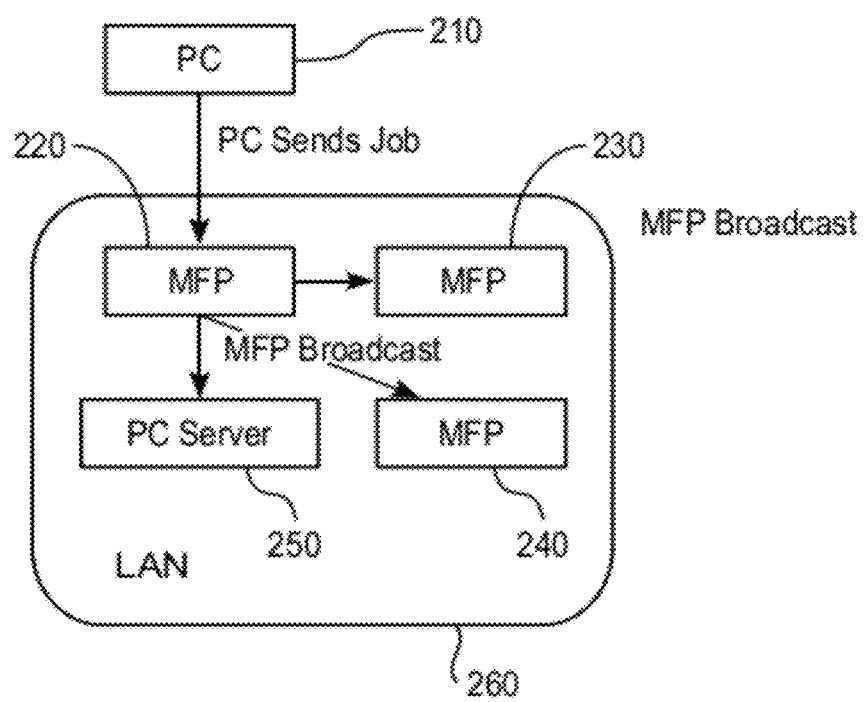
FIG. 2 is a diagram of a system for searching for missing resources in a local area network (LAN) in accordance with an exemplary embodiment.

FIG. 2 is a diagram of a system 200 for searching for missing resources within a local area network (LAN) in accordance with an exemplary embodiment. The system 200 includes a personal computer (or host computer) 210, a plurality of image forming apparatuses 220, 230, 240, which are preferably in the form of multifunctional printers (MFP) or all-in-ones (AIO), and at least computer (i.e., personal computer and/or server) 250. It can be appreciated that the plurality of image forming apparatuses 220, 230, 240 and at least one computer 250 are exemplary only, and the apparatuses and computer 220, 230, 240, 250 can be any device, which has the capability of storing resources, which can be provided to an image forming apparatus 220 upon request. Devices can include image forming apparatuses, multifunctional printers, all-in-ones printers, computers and personal computers, servers, etc.

In accordance with an exemplary embodiment, each of the plurality of image forming apparatuses 220, 230, 240 and the computer 250 are preferably configured to host or store at least one resource. The at least one resource can include and is not limited to graphics and/or images, logos, form overlays, fonts, etc. As shown in FIG. 2, each of the plurality of image forming apparatuses 220, 230, 240 and computer 250 are preferably located within a local area network (LAN) 260.

In accordance with an exemplary embodiment, the personal computer 210 sends a print job with a resource call-out to one of the plurality of image forming apparatuses (or MFPs) 220. The image forming apparatus 220 receives the print request (or print job) from the personal computer 210 and checks the image forming apparatus 220 for the resource, which has been called out by the print job. The image forming apparatus 220 (or print engine associated therewith) checks for the resource within the memory (i.e., hard disk) of the image forming apparatus 220. If the resource is not available on the image forming apparatus 220, the image forming apparatus 220 broadcasts to other image forming apparatuses and/or computers 230, 240, and 250 (which are collectively referred to herein as "devices") within the LAN for a copy of the resource. Each of the image forming apparatuses and computers 230, 240, 250 preferably receives the broadcast directly from the image forming apparatus 220. However, it can be appreciated that in accordance with an alternative embodiment, the broadcast can be sent to one or more of the image forming apparatuses or computers (i.e., devices) by one or more image forming apparatuses, computers and/or devices within the local area network (LAN) 260, which act as a proxy.

In accordance with an exemplary embodiment, the image forming apparatuses and computers 230, 240, 250 within the LAN 260 receive the broadcast and check for the resource within their memory (or hard disk drive), and if the resource is available, each of the image forming apparatuses and computers 230, 240, 250 having the resource forwards a response to the image forming apparatus 220. The image forming apparatus 220 receives the responses from the image forming apparatuses and computers 230, 240, 250 having the resource, and then preferably chooses an image forming apparatus or computer 230, 240, 250 from the one or more image forming apparatuses and computers 230, 240, 250 having the resource, and sends a request to the image forming apparatus or computer for the resource. It can be appreciated that in accordance with an exemplary embodiment, the image forming apparatus 220 can notify each of the one or more image forming apparatus and computers 230, 240, 250, which are not selected that the resource has been received. Upon receipt of the resource, the print engine of the image forming apparatus 220 prints at least one copy of the print job onto a printable medium.

In accordance with another exemplary embodiment, the response from the one or more image forming apparatuses and computers 230, 240, 250 can include an indication that resource that has been requested is a non-sharable resource. The non-sharable resource preferably requires the image forming apparatus (or user) purchase a single user license and/or a multi-user license for access to the non-sharable resource. In a preferred embodiment, the response from the image forming apparatuses and computers 230, 240, 250 includes at least one link to where the non-sharable resource can be obtained. The image forming apparatus 220 can choose a link to the non-sharable resource from the responses from the LAN 250 and preferably obtains the non-sharable resource via the link. It can be appreciated that the link can be to a server, a computer device and/or an image forming apparatus, which hosts the non-sharable resource.

It can be appreciated that the if the non-sharable resource is a single user license, the response from the image forming apparatuses and/or computers 230, 240, 250 preferably includes a rejection for the non-sharable resource, which advises the image forming apparatus (or user) that the purchase of a single user license is necessary. Alternatively, if a multi-user license is required, the response from the image forming apparatuses and computers 230, 240, 250 can include a request for user authentication in the form of an encrypted password.

Figure 3:
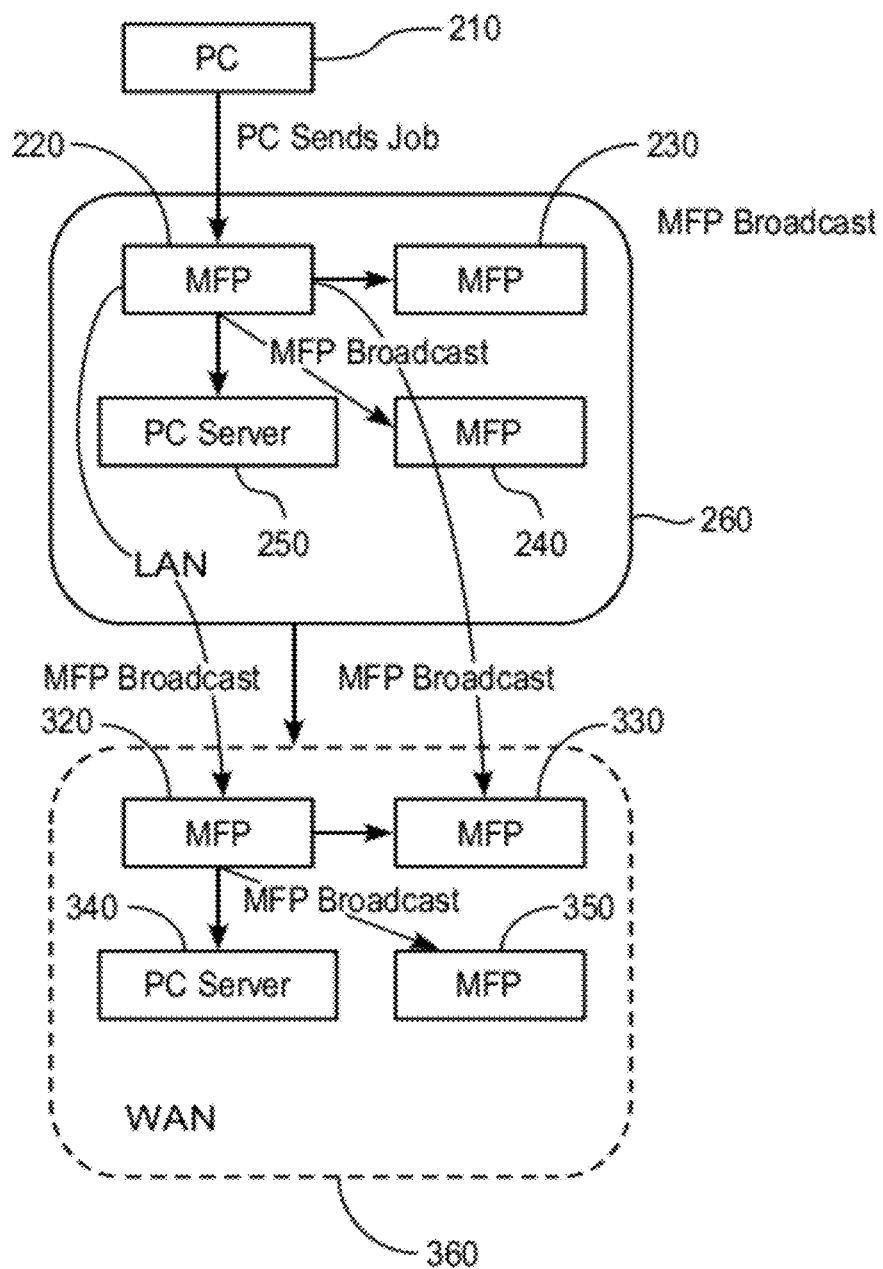
FIG. 3 is a diagram of a system for searching for missing resources within a local area network (LAN) and a wide area network (WAN) in accordance with another exemplary embodiment.

FIG. 3 is a diagram of a system 300 for searching for missing resources within a local area network (LAN) 260 and a wide area network (WAN) 360 in accordance with another exemplary embodiment. As shown in FIG. 3, if none of the one or more image forming apparatuses and computers 220, 230, 240, 250 within the LAN 260 has the resource (i.e., none of the devices 220, 230, 240, 250 within the LAN respond to the request), the image forming apparatus 220 broadcasts a request for the resource to image forming apparatuses and computers (collectively referred to as "devices") 320, 330, 340, 350 within the wide area network (WAN) 360.

In accordance with an exemplary embodiment, the image forming apparatuses and computers 320, 330, 340, 350 within the WAN 360 receive the broadcast and check for the resource within their memory (or hard disk drive), and if the resource is available, each of the image forming apparatuses and computers 320, 330, 340, 350 having the resource forwards a response to the image forming apparatus 220. The image forming apparatus 220 receives the responses from the image forming apparatuses and computers 320, 330, 340, 350 having the resource, and preferably chooses an image forming apparatus or computer 320, 330, 340, 350 from the one or more image forming apparatuses and computers 320, 330, 340, 350 having the resource and sends a request to the image forming apparatus or computer 320, 330, 340, 350 for the resource.

In accordance with an exemplary embodiment, an image forming apparatus (i.e., 320) located within the WAN 360 can act as a proxy device, which broadcasts the request for the missing resource (i.e., font) within the WAN 360. The proxy device 320 forwards the request to other image forming apparatuses or computers 330, 340, 350 with the WAN 360 and forwards the responses to the image forming apparatus 220.

Figure 4:
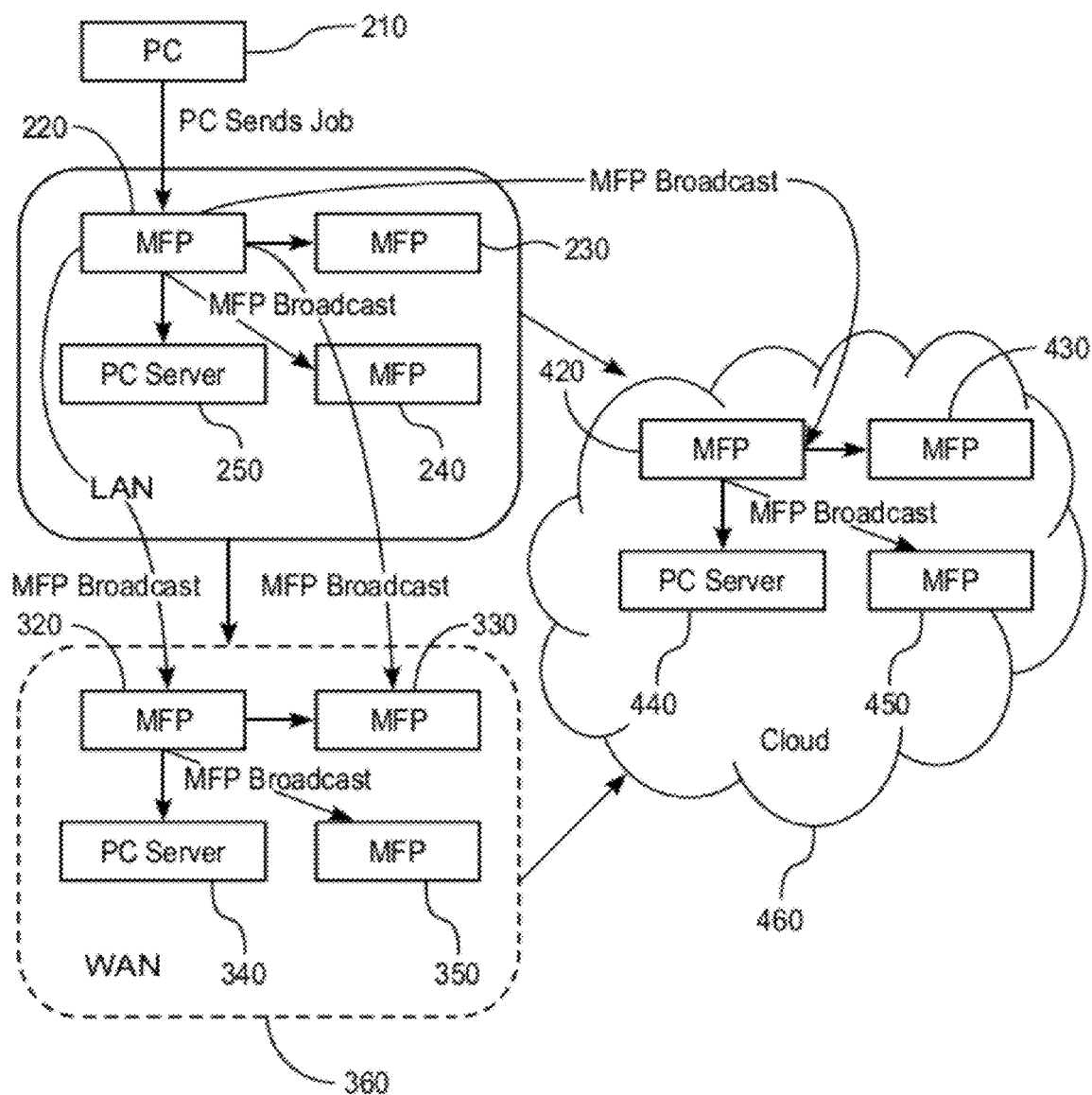
FIG. 4 is a diagram of a system for searching for missing resources within a local area network (LAN), a wide area network (WAN) and World Wide Web (or cloud) in accordance with a further exemplary embodiment.

FIG. 4 is a diagram of a system 400 for searching for missing resources within a local area network (LAN) 260, a wide area network (WAN) 360 and a world wide web (or cloud) 460 in accordance with a further exemplary embodiment. It can be appreciated that the World Wide Web (or cloud) is preferably an Internet-based computing network, which includes resources, software, and information, which can be provided to image forming apparatuses, computers and other devices on demand. In accordance with an exemplary embodiment, if none of the one or more image forming apparatuses and computers within the LAN 260 and WAN 360 has the resource, the image forming apparatus 220 broadcasts the request for the resource to image forming apparatuses and computers 420, 430, 440, 450 within the World Wide Web (or cloud) 460. It can be appreciated that if any of the image forming apparatuses or computers has the resource, a response is sent to the image forming apparatus 220 and the image forming apparatus 220 chooses an image forming apparatus or computer 420, 430, 440, 450 from the one or more image forming apparatuses and computers 420, 430, 440, 450 having the resource and sends a request to the image forming apparatus or computer 420, 430, 440, 450 for the resource. It can be appreciated that in accordance with an exemplary embodiment, in the step of broadcasting the request for the resource, the one or more devices within the LAN 260 have a priority over the one or more devices within the WAN 360 and the World Wide Web 460.

In accordance with an exemplary embodiment, if none of the one or more image forming apparatuses and computers within the LAN 260, WAN 360 and/or World Wide Web 460 has the resource, the image forming apparatus 220 substitutes a similar resource or defaults to a default resource for the resource call-out.

Figure 5:
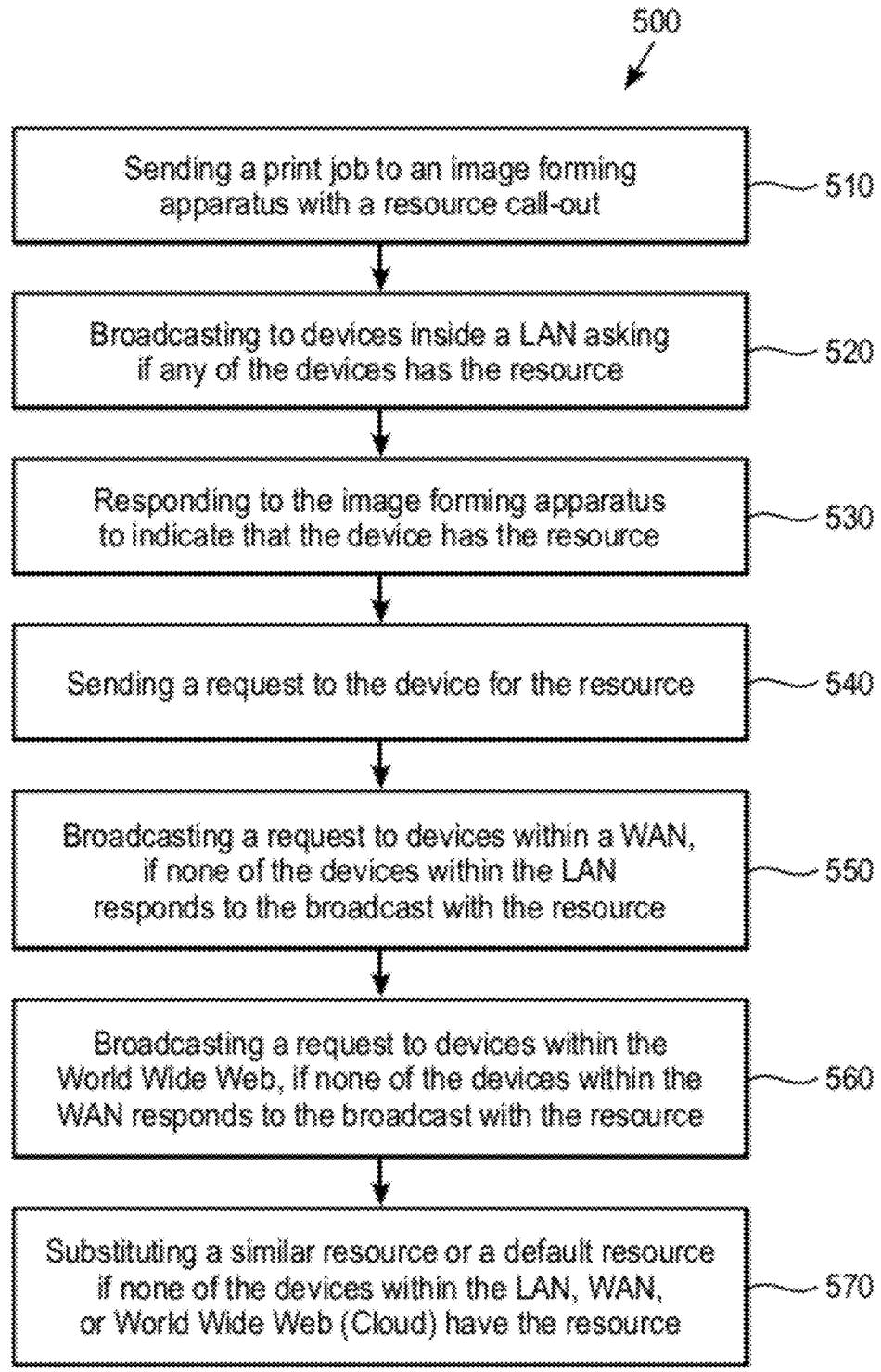
FIG. 5 is a flow chart of a method for searching for missing resources within a local area network (LAN), a wide area network (WAN) and World Wide Web (or cloud) in accordance with a further exemplary embodiment.

FIG. 5 is a flow chart of a method for searching for missing resources within a local area network (LAN), a wide area network (WAN) and a World Wide Web (or cloud) 500 in accordance with a further exemplary embodiment. As shown in FIG. 5, the personal computer (or host computer) sends a print job to an image forming apparatus (MFP) with a resource call-out 510. If the image forming apparatus does not have the resource stored in its hard disk, the image forming apparatus broadcasts to one or more devices (other image forming apparatuses, computers and/or servers) inside its LAN asking if any of the one or more devices has the resource stored in their memory and/or on their hard disk 520. Each of the devices having the resource will respond to the image forming apparatus (MFP) by indicating that the device has the resource 530. The image forming apparatus then chooses which of the devices having the resource it wants to obtain the resource from and notifies the device of its request by sending a request to the device 540. Once the image forming apparatus (MFP) can acknowledge that it received the resource, it can notify all of the other devices that it has already has the resource and the resource is no longer needed. It can be appreciated, that in an alternative embodiment, the image forming apparatus (MFP) does not need to inform each of the other devices having the resource that it has fulfilled its request. If for some reason, the image forming apparatus (MFP) does not receive a response from the one or more devices with in the local area network (LAN) indicating that the resource is available and/or where the resource can be found, the image forming apparatus (MFP) will start the query again, however, this time the image forming apparatus will send the request to a wide area network (WAN) and make the similar broadcast request 550. If the resource cannot be found in the WAN, the image forming apparatus will then broadcast the request for the resource to the World Wide Web (cloud) 560. If after exhausting all possibilities, and if the image forming apparatus has not received the resource from any of the devices within the LAN, WAN, or World Wide Web (Cloud), and the image forming apparatus (MFP) will default to substituting a similar resource or using a default resource 570.

Figure 6:
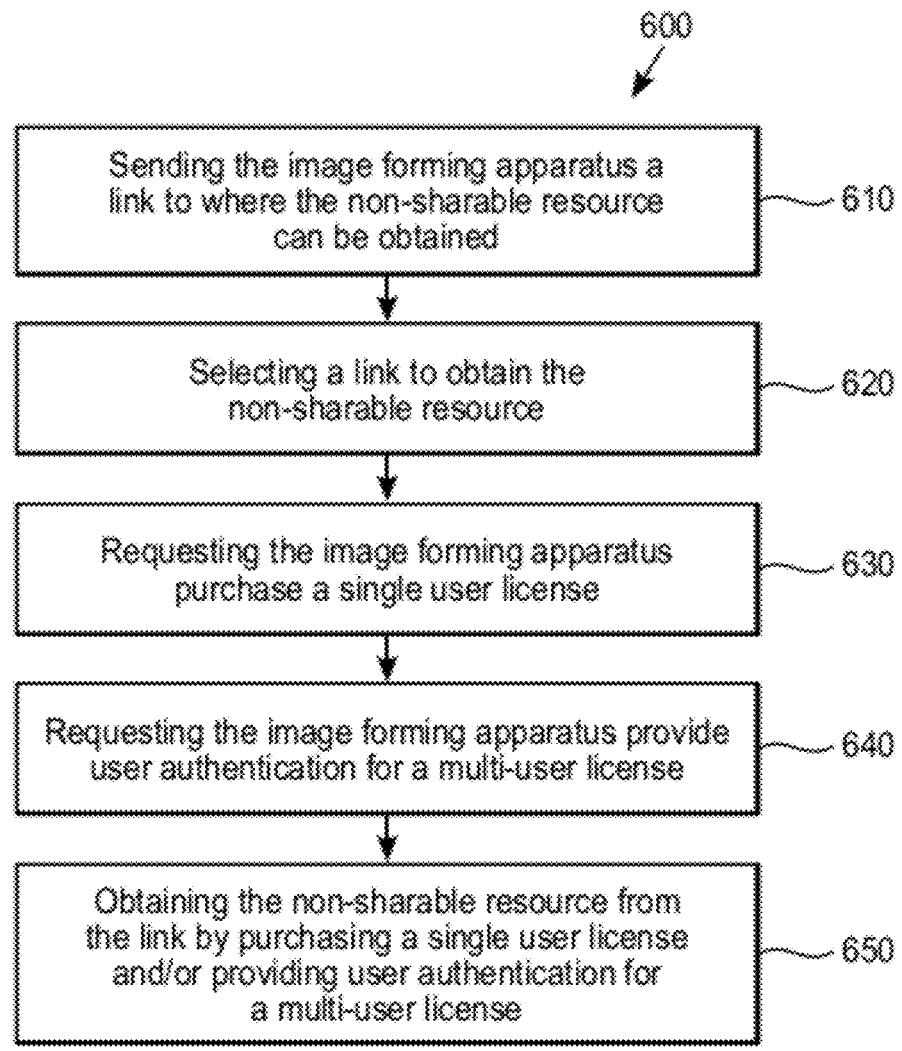
FIG. 6 is a flow chart of a method for searching for missing non-sharable resources within a local area network (LAN), a wide area network (WAN) and a World Wide Web (or cloud) in accordance with another exemplary embodiment.

FIG. 6 is a flow chart of a method for searching for missing non-sharable resources within a local area network (LAN), a wide area network (WAN) and a World Wide Web (or cloud) 600 in accordance with another exemplary embodiment. It can be appreciated that in some circumstances, the resource (i.e., a non-sharable resource) cannot be provided to the requesting the image forming apparatus (MFP) without the purchase of a single user license or user authentication for a multi-user license. For example, a device, which has the resource, may not be allowed to share the resource without user authentication and/or receipt of an encrypted password. In accordance with an exemplary embodiment, at least one of the devices preferably knows where the image forming apparatus (MFP) can obtain the resource and sends the image forming apparatus (MFP) a link to where the resource can be obtained 610. The link requests the image forming apparatus provide user authentication for the resource 620, or alternatively, the link can advise the image forming apparatus that the resource is a non-sharable resource, which requires the purchase of a single-user license 630. It can be appreciated that the link can be in the form of an IP address where the non-sharable resource is stored, or the link can be a URL of a web server, etc. The image forming apparatus (MFP) then chooses which link it wants to use to obtain the resource 640. If the non-sharable resource necessitates a single user license, the link will provide the image forming apparatuses where the resource can be purchased. If the non-sharable resource necessitates a multi-user license, the device will request user authentication in the form of an encrypted password. It can be appreciated that if the image forming apparatus does not receive any response from any device within the LAN, the image forming apparatus will start the query again but this time it will go to the WAN and make the similar broadcast request. If the resource cannot be found in the WAN, then it will go to the World Wide Web (cloud) to ask for the resource. If after exhausting all possibilities and ascertaining that none of the devices within the image forming apparatuses' LAN, WAN, or World Wide Web (or cloud), then the image forming apparatus can substitute a similar resource or use a default resource for the resource call-out.

In accordance with another exemplary embodiment, the image forming apparatus has a search policy for obtaining the resource call-out from image forming apparatuses and computers, which have the resource. In accordance with an exemplary embodiment, the search policy can be defined and/or modified by the user, depending on the image forming apparatus' environment. For example, if the image forming apparatus is located in a foreign country and the devices that may have the resource are located in the United States, it can be appreciated that it can take longer for the image forming apparatus (MFP) to broadcast and start the communication protocol between itself and the device (i.e., too many hops involved). Accordingly, in an alternative embodiment, the image forming apparatus can ask one of the devices in the United States to act as a proxy (or proxy device) to do the search within the United States on the image forming apparatuses' behalf. In accordance with another example, the search can be restricted to devices based on IP addresses (with masking), restricted to specific IP addresses, and/or restricted to a member list, etc.

It can be appreciated that in accordance with an exemplary embodiment, the priority of the search policy is preferably defined by the user. It can be appreciated that the search policy (or policies) can be implemented by the user, and wherein each policy is not necessarily ordered based on priority, but rather defined by the user. For example, the following are illustrative search policies: (1) the image forming apparatus (MFP) performs its own search, no restrictions performed; (2) the image forming apparatus asks a proxy device to perform the search, and the search is performed inside a local area network (LAN); (3) the image forming apparatus ask a proxy device to perform the search, and the search is performed inside a wide area network (WAN); (4) the image forming apparatus asks a proxy device to perform the search, and the search is performed inside the World Wide Web (or Cloud); (5) the image forming apparatus asks a proxy device to perform the search, and the search is performed inside a range of IP addresses inside the LAN/WAN/Cloud; (6), the image forming apparatus asks a proxy device to perform the search, and the search is performed inside a specific list of IP addresses inside the LAN/WAN/Cloud; and (7) the image forming apparatus asks a proxy device to perform the search, and the search is performed inside devices that belong to a list of members (or member list). It can be appreciated that the member list can be one in which the device is owned by a particular department, and/or if the device supports a particular feature. For example, if the requesting resource is a MICR font (Magnetic Ink Character Recognition font), the member list can be a list of devices that support MICR. In addition, once the proxy device finds the location of the resource, the proxy device can act as the owner of the resource by getting the resource itself and passing it to the image forming apparatus (MFP), or, the proxy device can tell the image forming apparatus (MFP) the location of the device where the resource can be obtained.

It can be appreciated that the methods as described herein can also be implemented by a computer program product comprising a non-transitory computer usable medium having a computer readable code embodied therein for controlling an image forming apparatus, the computer readable program code configured to cause the image forming apparatus to execute a process for producing a print job as described herein.

In accordance with the exemplary embodiment, at least one copy of the document is printed on the image forming apparatus (or printing device) 120. It can be appreciated that the print job can be sent via any suitable network (or network connection) 130. The image processing section 124 preferably handles the communication between the host application or printer driver of the host computer 110 and the image forming apparatus 120. The image processing section (or data dispatcher) 124 gathers the reference data from the controller 122 or directly from the print engine 126 of the image forming apparatus or printing device 120 and passes it on to the printer driver. It can be appreciated that the controller 122 can be embedded inside the printing device 120 or it can be an externally located and connected through the network 130.

It can be appreciated that the process and method can be introduced into the apparatus by updating firmware in the non-volatile memory of the image forming apparatus 120. In this regard, the method can be brought to the apparatus in a form of a package of install software and the printer driver and firmware, which may be divided and/or compressed so that the install software effectively installs the printer driver and firmware. The package may be steadily stored in a computer readable diskette, such as a compact disk, or may be transmitted through a wire/wireless communication line.

The method described above can be used to print on paper or other suitable printing medium such as thin plastic sheets, etc. The computer readable medium, of course, can be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention can be implemented such that its software part has been written onto a recording medium in advance and will be read as required in operation.

Thus, as used in this disclosure and the appended claims, the term "image forming apparatus", "printer" or "printing device" should be broadly understood to refer to any machine that has a print function, including printers, copiers, and all-in-one machines and multi-function printers, which have printing, scanning and copying functions. The term "print job" and/or "printing" similarly include both printing and copying, i.e., it refers to producing images on a recording medium either from a data received from an external device such as a host computer or from data generated by scanning an original hard copy.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of searching for missing resources associated with an image forming apparatus, comprising:
    receiving, by the image forming apparatus, a print job from a host computer, the print job having a non-sharable resource call-out that calls out a non-sharable resource selected from a group consisting of graphics, an image, a logo, a form overlay, and a font;
    checking the image forming apparatus for the non-sharable resource, which has been called out by the print job, and if the non-sharable resource is not available on the image forming apparatus, obtaining the non-sharable resource by:
        sending a request for the non-sharable resource from the image forming apparatus to a device having the non-sharable resource, wherein the device having the non-sharable resource is a separate device external to the image forming apparatus;
        receiving a response from the device including at least one link to where the non-sharable resource can be obtained; and
        choosing a link having the non-sharable resource and obtaining the non-sharable resource, wherein the non-sharable resource requires either of a single user license or a multi-user license, and wherein if the non-sharable resource requires a single user license, rejecting a request for the non-sharable resource until the single user license has been purchased, and if the non-sharable resource is a multi-user license, requesting user authentication in a form of an encrypted password.

2. The method of claim 1, wherein the step of sending the request for the non-sharable resource comprises:
    broadcasting the request for the non-sharable resource from the image forming apparatus to one or more devices within a local area network (LAN), a wide area network (WAN), and a World Wide Web.

3. The method of claim 2, wherein in the step of broadcasting the request for the non-sharable resource, the one or more devices within the LAN have a priority over the one or more devices within the WAN and the World Wide Web.

4. The method of claim 2, wherein if none of the one or more devices within the LAN has the non-sharable resource, broadcasting the request for the non-sharable resource to one or more devices within a wide area network (WAN).

5. The method of claim 4, wherein if none of the one or more devices within the LAN and WAN has the non-sharable resource, broadcasting the request for the non-sharable resource to one or more devices within a World Wide Web.

6. The method of claim 5, wherein if none of the one or more devices within the LAN, WAN and World Wide Web has the non-sharable resource, substituting a similar resource for the non-sharable resource call-out.

7. The method of claim 5, wherein if none of the one or more devices within the LAN, WAN and World Wide Web has the non-sharable resource, defaulting to a default resource for the non-sharable resource call-out.

8. The method of claim 1, wherein the image forming apparatus has a search policy for obtaining the non-sharable resource.

9. The method of claim 8, wherein the search policy is performed by a proxy device, which acts as the owner of the non-sharable resource and passes the non-sharable resource to the image forming apparatus.

10. The method of claim 8, wherein the search policy is performed by a proxy device, which provides the image forming apparatus with the location of the non-sharable resource.

11. The method of claim 1, further comprising printing at least one copy of the print job with the non-sharable resource on the image forming apparatus.

12. A computer program product comprising a non-transitory computer usable medium having a computer readable code embodied therein, the computer readable program code configured to cause an image forming apparatus to execute a process for producing a print job, the process comprising the steps of:

receiving a print job from a host computer, the print job having a non-sharable resource call-out that calls out a non-sharable resource selected from a group consisting of graphics, an image, a logo, a form overlay, and a font;

checking the image forming apparatus for the non-sharable resource, which has been called out by the print job, and if the non-sharable resource is not available on the image forming apparatus;

sending a request for the non-sharable resource from the image forming apparatus to a device having the non-sharable resource, wherein the device having the non-sharable resource is a separate device external to the image forming apparatus;

receiving a response from the device having the non-sharable resource including at least one link to where the non-sharable resource can be obtained; and choosing a link having the non-sharable resource and obtaining the non-sharable resource, wherein the non-sharable resource requires either of a single user license or a multi-user license, and wherein if the non-sharable resource requires a single user license, rejecting a request for the non-sharable resource until the single user license has been purchased, and if the non-sharable resource is a multi-user license, requesting user authentication in a form of an encrypted password.

13. The computer program of claim 12, wherein the step of sending the request for the non-sharable resource comprises:
broadcasting the request for the non-sharable resource from the image forming apparatus to one or more devices within a local area network (LAN), a wide area network (WAN), and a World Wide Web.

14. The computer program of claim 13, wherein in the step of broadcasting the request for the non-sharable resource, the one or more devices within the local area network (LAN) have a priority over the one or more devices within the WAN and the World Wide Web.

15. A printing system comprising:
a host computer; and
an image forming apparatus having a memory unit and a print engine connected to the memory unit for forming an image on a recording medium, wherein the image forming apparatus performs the following steps:
receiving the print job from a host computer, the print job having a non-sharable resource call-out that calls out a non-sharable resource selected from a group consisting of graphics, an image, a logo, a form overlay, and a font;

checking the image forming apparatus for the non-sharable resource, which has been called out by the print job, and if the non-sharable resource is not available on the image forming apparatus;

sending a request for the non-sharable resource from the image forming apparatus to a device having the non-sharable resource, wherein the device having the non-sharable resource is a separate device external to the image forming apparatus;

receiving a response from the device including at least one link to where the non-sharable resource can be obtained; and choosing a link having the non-sharable resource and obtaining the non-sharable resource, wherein the non-sharable resource requires either of a single user license or a multi-user license, and wherein if the non-sharable resource requires a single user license, rejecting a request for the non-sharable resource until the single user license has been purchased, and if the non-sharable resource is a multi-user license, requesting user authentication in a form of an encrypted password.

16. The system of claim 15, wherein the step of sending the request for the non-sharable resource comprises:
broadcasting the request for the non-sharable resource from the image forming apparatus to one or more devices within a local area network (LAN), a wide area network (WAN), and a World Wide Web.

17. The system of claim 16, wherein in the step of broadcasting the request for the non-sharable resource, the one or more devices within the local area network (LAN) have a priority over the one or more devices within the WAN and the World Wide Web.

18. A method for managing a first one of a plurality of image forming apparatuses to execute a print job that has a resource call-out that calls out a resource, the method comprising:
checking the first one of the plurality of image forming apparatuses for the resource, which has been called out by the print job; and
if the resource is not available on the first one of the plurality of image forming apparatuses, obtaining the resource by:
sending a request for a copy of the resource to a second one of the plurality of image forming apparatuses having the resource;
if the resource is sharable, receiving from the second one of the plurality of image forming apparatuses the copy of the resource;
if the resource is non-sharable, receiving from the second one of the plurality of image forming apparatuses a link to where resource can be obtained; and
choosing, if the resource is non-sharable, the link having the resource and obtaining the resource.

19. The method of claim 18, wherein the resource having called out by the print job is selected from a group consisting of graphics, an image, a logo, a form overlay, and a font.

20. The method of claim 18, wherein the resource is non-sharable and requires a single user license, and the method further comprising:
rejecting a request for the resource until the single user license has been purchased.

21. The method of claim 18, wherein the resource is non-sharable and requires a multi-user license, and the method further comprising:
requesting user authentication in a form of an encrypted password.

\* \* \* \* \*